United States Patent Office 2,945,031
Patented July 12, 1960

2,945,031

METHYLENEDIOXY SUBSTITUTED PHENOTHIAZINES

Maxwell Gordon, Elkins Park, Pa., assignor to Smith Kline & French Laboratories, Philadelphia, Pa., a corporation of Pennsylvania No Drawing. Filed Oct. 13, 1958, Ser. No. 766,658

7 Claims. (Cl. 260—243)

This invention relates to new methylenedioxy substituted phenothiazines which are therapeutically active compounds.

The new compounds of this invention have utility as pharmacodynamically active agents. More specifically, these compounds are useful as tranquilizers, calmatives, antiemetics and general central nervous system depressants.

The methylenedioxy substituted phenothiazines of this invention are represented by the general formula:

FORMULA 1

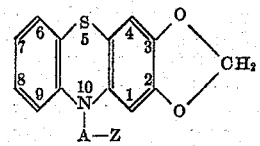

when:
A represents a divalent, saturated straight or branched alkylene chain containing from 2 to 4 carbon atoms, separating the two nitrogens to which it is attached by at least 2 carbons preferably propylene, or 2-methylpropylene; and Z represents dimethylamino, diethylamino, N-formylpiperazinyl, piperazinyl, N-methylpiperazinyl, N-hydroxyethylpiperazinyl, N-acetoxyethylpiperazinyl, N-hydroxyethoxyethylpiperazinyl, N-pyrrolidinyl, N-p-nitrophenethylpiperazinyl, N-p-aminophenethylpiperazinyl.

An advantageous compound of this invention is 10-(3-dimethylaminopropyl)-2,3 - methylenedioxyphenothiazine.

This invention also includes pharmaceutically acceptable addition salts of the above defined bases formed with nontoxic organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example 8-chlorotheophylline and 8-bromotheophylline. Exemplary of such inorganic salts are those with hydrochloric, hydrobromic, sulfuric, sulfamic, phosphoric and nitric acids. These salts may also be prepared by the classical method of double decomposition of appropriate salts which is well-known to the art.

The novel 2,3-methylenedioxyphenothiazine useful as an intermediate in the preparation of the compounds of Formula 1 and a part of this invention is represented by the following formula:

FORMULA 2

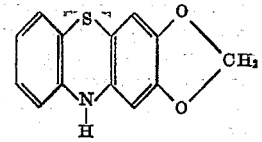

The compounds of this invention are prepared from piperonal according to the following synthetic procedure:

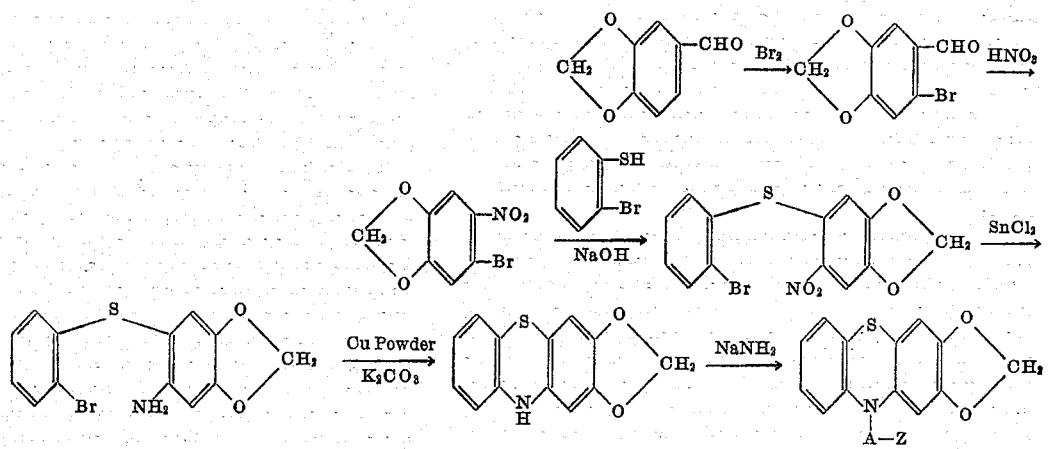

The following general procedure is used to prepare the methylenedioxy substituted phenothiazines of this invention. This method is carried out using readily-available starting materials and gives excellent yields of the end product.

A stirred solution of piperonal in glacial acetic acid is slowly treated with a solution of bromine in glacial acetic acid to give 6-bromopiperonal. The 6-bromopiperonal is then converted to 4-nitro-5-bromocatechol by nitration with concentrated nitric acid. This is then condensed with -o-bromothiophenol under alkaline conditions to give 2 - nitro - 4,5-methylenedioxy-2'-bromodiphenylsulfide. The nitro group on the 2 position is then reduced with stannous chloride-hydrochloric acid and this yields 2-amino-4,5 methylenedioxy-2'-bromodiphenylsulfide. Ring closure is brought about by heating at reflux the 2-amino-4,5 methylenedioxy-2'-bromodiphenylsulfide in the presence of an acid binding agent. Exemplary of such acid-binding agents are the alkali metal carbonates, such as sodium carbonate, sodium bicarbonate or preferably potassium carbonate. The reaction is run in a suitable nonreactive organic solvent in which the reactants are at least partially soluble. Exemplary are dioxane, dimethylaniline, diethylformamide, methylformamide, dimethylformamide or dimethylacetamide. Preferably, the solvent is dimethylformamide and other similar low-carbon amides. Optimum yields are obtained when catalytic amounts of copper or copper-bronze powder are added. Ring closure of the 2-amino-4,5 methylenedioxy-2'-bromodiphenylsulfide, as described above, yields 2,3-methylenedioxyphenothiazine.

The 2,3 methylenedioxyphenothiazine, Formula 2, is condensed with a reactive tertiary aminoalkyl ester having the desired dialkylaminoalkyl group to form the 10-aminoalkylmethylenedioxyphenothiazine of Formula 1. Any reactive tertiary aminoalkyl ester containing the desired A–Z moiety may be used, such as the halides, preferably bromide or chloride, or the sulfonic esters, preferably p-toluene sulfonate. The condensation is preferably carried out at a temperature in the range of from about 30° C. to about 160° C. The condensation is carried out advantageously by refluxing the reactants in an inert aromatic solvent such as, preferably, benzene, toluene or xylene in which at least one of the reactants must be soluble. A suitable acid-binding agent is usually included, such as an alkali metal amide, preferably sodium, potassium or lithium amide. Other acid-binding agents are alkali metal hydride, preferably sodium hydride or alkali metal aryl or alkyl compound, preferably phenyl or octyl sodium. If the acid addition salt of the reactive ester is used, a corresponding increase in acid-binding agent must be used.

The preferred method of alkylation, however, is to react the methylenedioxyphenothiazine nucleus, Formula 2, with an aminoalkyl chloride or bromide with a slight excess of sodium or potassium amide in refluxing benzene or toluene for from about 30 minutes to about 36 hours, preferably 3 to 8 hours. The substituted methylenedioxyphenothiazine is isolated by adding an excess of water to the cooled reaction mixture. The organic layers are extracted with dilute acid, preferably dilute hydrochloric acid. The acid extracts are combined, neutralized and extracted with benzene. The extracts are distilled under vacuum and the finished product obtained usually as an oil.

The ω-piperazinylalkylmethylenedioxyphenothiazines are prepared by alkylating methylenedioxyphenothiazine with a ω-haloalkylpiperazine with the free N-hydrogen of the piperazinyl moiety protected by, for example, a benzyl, carbobenzoxy or acyl, preferably a formyl or carbethoxy group. The N-protective group is then removed by mild hydrolysis. The resulting ω-piperazinyl alkylmethylenedioxyphenothiazine may then be further alkylated to form various modifications of Formula 1. Such methods of alkylation are by a reactive ester such as an alkyl halide in the presence of an acid-binding agent in inert solution such as benzene or butanone, by reaction with an alkylene oxide such as ethylene oxide in alcohol or by alkylation with a halogenated alcohol such as bromoethanol in the presence of an acid-binding agent, for example potassium carbonate.

Still another method to prepare these compounds is by means of ω-ester alkylmethylenedioxyphenothiazines which have a reactive end group on the 10-alkyl chain, for example, an ω-tosylate or ω-chloro end group, which can be reacted with various amines, for instance by refluxing the ester and amines in the presence of an acid binder for short periods.

It will be readily apparent to one skilled in the art that variations of these preparative procedures are possible. The preferable preparative procedures are the methods discussed above, most advantageously, N-alkylation of the methylenedioxyphenothiazine in the 10 position of the nucleus by a reactive ester.

It will also be readily apparent to one skilled in the art that certain of the compounds of this invention, notably those in which A is represented by a branched aliphatic carbon chain so that an asymmetric carbon atom is formed, may be present as optical isomers. The connotation of the general formulae presented herein is to include all isomers, particularly the separated $d$ or $l$ optical isomers as well as the $dl$ mixture of these isomers. If desired, the isomers may be separated for individual use by separation methods known to the art, such as fractional crystallization, for instance, of the $d$-tartrate salts of the 10-aminoalkylated 2,3 methylenedioxyphenothiazine derivatives. Alternatively, a synthesis starting with an optically active side chain may yield the desired optical isomer.

The following examples are not limiting but are illustrative of compounds of this invention and the procedures for their preparation.

Example 1

A stirred solution consisting of 300 g. of piperonal in 600 ml. of glacial acetic acid is slowly treated dropwise with a solution consisting of 120 ml. of bromine in 300 ml. of glacial acetic acid. During the addition the reaction is cooled. After standing 48 hours at room temperature the 6-bromopiperonal crystals are filtered and water is added to the filtrate. The precipitate that forms consists of a mixture of 6-bromopiperonal and 4,5-dibromocatechol methylene ester. This mixture is stirred rapidly with a warm aqueous solution of sodium bisulfite. The dissolved 6-bromopiperonal is recovered from the filtrate after the addition of sodium carbonate. Both fractions of 6-bromopiperonal are recrystallized from hot ethanol and gave a melting point of 127–128.5° C.

To 1400 ml. of stirred concentrated nitric acid immersed in a water bath at 25° C. is added gradually, in a period of 1 to 5 hours, 210 g. of 6-bromopiperonal. The addition is conducted at a rate as to maintain an internal temperature no greater than 25° C. After 2 hours the mixture is poured onto 4 l. of ice water. The precipitated light yellow solid is collected and washed well with water. Recrystallization from ethanol produces 4-nitro-5-bromocatechol methylene ether as yellow needles with a melting point of 88–89° C.

A solution of 147.6 g. of 4-nitro-5-bromocatechol methylene ether in 1250 ml. of hot ethanol is stirred and to this is added dropwise a solution of sodium o-bromothiophenol which is prepared by dissolving 113.4 g. of o-bromothiophenol in 500 ml. of ethanol and adding 23.9 of sodium hydroxide in 25 ml. of water. During the addition the bright yellow product commences to precipitate from the reddish-orange reaction solution. The mixture is allowed to reflux for 3 hours, cooled to 0° C. and filtered. Several washings with cold ethanol produces 4,5-methylenedioxy-2-nitro-2'-bromodiphenylsulfide as bright yellow crystals with a melting point of 149–150° C.

To a stirred solution of 426.6 g. of stannous chloride in 675 ml. of concentrated hydrochloric acid and 675 ml. of ethanol at 70–80° C. is added, in portions, 186 g. of 4,5-methylenedioxy-2-nitro-2'-bromodiphenylsulfide. The mixture is then allowed to reflux for 4 hours. The brown solution is then poured on to 4 l. of ice water. A gum forms which slowly solidifies. The tan solid is collected washed well with water and dried in vacuo at 100° C. Recrystallization from benzene-petroleum ether with a Norit charcoal treatment yields 2-amino-4,5 methylenedioxy-2'-bromodiphenylsulfide as white crystals with a melting point of 142–143.5° C.

A mixture of 3.6 g. of 2-amino-4,5 methylenedioxy-2'-bromodiphenylsulfide, 1.56 g. of anhydrous granular potassium carbonate and 0.2 g. of copper bronze powder is refluxed 45 ml. of dimethylformide with stirring for 6 hours. The evolution of $CO_2$ ceases at this time. The purple mixture is filtered and the filtrate diluted with warm water. The purple precipitate is collected and dried in vacuo. It is then extracted with benzene and the extracts are treated with alumina and charcoal. Cooling the benzene filtrate gives 2,3-methylenedioxyphenothiazine as light purple platelets with a melting point of 202 to 203° C. The purified sample is obtained by sublimation as white platelets from benzene with a melting point of 202–203.5° C.

*Example 2*

A suspension of 24.3 g. of 2,3-methylenedioxyphenothiazine (as prepared in Example 1) and 2.4 g. of lithium amide in 100 ml. of dry toluene is stirred, slowly heated to reflux temperature and refluxed for three hours. A solution of 13.3 g. of 3 chloro-1-dimethylaminopropane in 10 ml. of toluene is then added slowly and the resulting mixture refluxed for four hours. The excess lithium amide is decomposed by cautiously adding 10 ml. of water. The reaction mixture is then extracted with dilute hydrochloric acid and the acidic extracts neutralized with aqueous ammonia and subjected to a benzene extraction. The solvent is distilled off in vacuo, leaving the residual 10 - (3 - dimethylaminopropyl) - 2,3 - methylenedioxyphenothiazine as viscous oil.

A solution of 2.0 g. of the base in 50 ml. of dry ether is treated with ethereal hydrogen chloride to yield the hydrochloride salt.

*Example 3*

A suspension of 48.6 g. of 2,3-methylenedioxyphenothiazine (prepared as in Example 1) and 8.3 g. of sodamide in 500 ml. of xylene is vigorously stirred and heated at reflux for two hours. A solution of 32.7 g. of 2-chloro-1-diethylaminopropane in 100 ml. of xylene is added and refluxing continued for three hours. The cooled reaction mixture is treated with 100 ml. of water and the toluene layer extracted with dilute mineral acid. The combined acid extracts are neutralized with ammonium hydroxide and the product taken up in benzene. The benzene is evaporated in vacuo and the resultant oil is 10-(diethylaminoisopropyl)-2,3-methylenedioxyphenothiazine. Treating the oil with maleic acid in ethyl acetate results in the formation of the maleate salt.

*Example 4*

A suspension of 72.9 g. of 2,3-methylenedioxyphenothiazine (prepared as in Example 1) and 12.3 g. of sodium amide in 600 ml. of dry toluene is stirred, heated to a reflux temperature and refluxed for three hours. A solution of 62.8 g. of 3-chloro-2-methyl-1-(N-methylpiperazinyl)-propane in 200 ml. of dry toluene is added with continued refluxing for an additional three hours. The cooled reaction mixture is treated with 300 ml. of water and the toluene layer extracted with dilute mineral acid. The acid extracts are made basic with ammonium hydroxide and extracted with benzene. The residual viscous basic oil is reacted with bismethylenesalicylic acid in ethyl acetate solution to give 10-[2-methyl-1-(N-methylpiperazinyl)-propyl] - 2,3 - methylenedioxyphenothiazine bismethylenesalicylate.

*Example 5*

A suspension of 36.4 g. of 2,3-methylenedioxyphenothiazine (prepared in Example 1) and 3.6 g. of lithium amide in 400 ml. of xylene is stirred, heated to reflux temperature and refluxed for one hour. A solution of 31.3 g. of 1-formyl-4-(3-chloropropyl)-piperazine in 100 ml. of xylene is added and refluxing continued for five hours. The cooled reaction mixture is treated with water and the toluene layer extracted with dilute hydrochloric acid. The acid extracts are made basic with ammonium hydroxide and the product is treated with benzene. The solvent is distilled in vacuo leaving 10-[3-(N-formylpiperazinyl)-propyl] - 2,3 - methylenedioxyphenothiazine as an oil.

*Example 6*

A solution of 79.4 g. of 10-[3-(N-formylpiperazinyl)-propyl]-2,3-methylenedioxyphenothiazine (prepared in Example 5) in 300 ml. of ethanol and 175 ml. of water containing 30 ml. of 40% sodium hydroxide solution is refluxed for two hours. The alcohol is removed by distillation in vacuo on a steam bath. The residue is treated with benzene-water and the dried organic layer evaporated in vacuo. The residual oil is 10-(3-piperazinylpropyl)-2,3-methylenedioxyphenothiazine.

*Example 7*

A stirred suspension of 18.45 g. of 10-(3-piperazinylpropyl)-2,3-methylenedioxyphenothiazine (prepared as Example 6), 6.5 g. of β-bromoethanol and 7.6 g. of potassium carbonate in 250 ml. of toluene is refluxed for five hours. Water is added to the reaction mixture and the separated toluene layer is extracted with dilute hydrochloric acid. The acid extracts are neutralized with ammonia and extracted with benzene. The solvent is distilled in vacuo to give a residue of 10-[3-N-β-hydroxyethylpiperazinyl) - propyl] - 2,3 - methylenedioxyphenothiazine.

Treating a sample of the free base in ether solution with excess anhydrous hydrogen bromide yields the dihydrobromide salt.

*Example 8*

A mixture of 41.3 g. of 10-[N-β-hydroxyethylpiperazinyl)-propyl]-2,3-methylenedioxyphenothiazine (as prepared in Example 7) in 500 ml. of benzene and 8.2 g. of acetyl chloride is reacted at room temperature for 12 hours. The reaction mixture is poured into water, neutralized and extracted with benzene. A solution of 1.0 g. of the viscous oily base (obtained on evaporation of the benzene) in 25 ml. of dry ether is treated with excess ethereal hydrogen chloride to give the hydrochloride salt of 10 - [ - 3 - (N-acetoxyethylpiperazinyl)-propyl]-2,3-methylenedioxyphenothiazine.

*Example 9*

A suspension of 36.9 g. of 10-(3-piperazinylpropyl)-2,3-methylenedioxyphenothiazine (as prepared in Example 6), 17.7 g. of 2-bromo-2'-hydroxyethyl ether (prepared by treating 2,2'-dihydroxyethyl ether with one equivalent of hydrobromic acid) and 15.2 g. of potassium carbonate in 800 ml. of xylene is heated at reflux for 20 hours. The reaction mixture is then treated with water and the separated organic layer extracted with dilute mineral acid. The acidic extracts are made basic and extracted with benzene. Evaporation of the solvent in vacuo yields 10 - [3 - (N-hydroxyethoxyethylpiperazinyl)-propyl] - 2,3-methylenedioxyphenothiazine.

Treating a solution of the free base in ethyl acetate with tartaric acid gives the corresponding tartrate salt.

*Example 10*

A stirred suspension of 97.3 g. of 2,3-methylene-dioxyphenothiazine (as prepared in Example 1) and 16.4 g. of sodamide in 900 ml. of toluene is refluxed and 90.6 g. of 4-bromo-1-pyrrolidinylbutane is added gradually After the addition is complete, stir and heat for 13 additional hours. The cooled mixture is carefully treated with ice water and the separated organic layer is washed with benzene and then extracted with dilute hydrochloric acid. The acid extracts are neutralized with sodium hydroxide solution and then ether extracted. The ether is evaporated and leaves 10-[4-(N-pyrrolidinyl-butyl]-2,3-methylenedioxyphenothiazine.

A solution of the base in ether is treated with glacial acetic acid to give the acetate salt.

*Example 11*

To a solution of 9.2 g. of 10-(3-piperazinylpropyl) 2,3 methylenedioxyphenothiazine (prepared in Example 6) in 40 ml. of dimethylformamide is added a solution of 5.7 g. of p-nitrophenethyl bromide in 5 ml. of dimethylformamide. After stirring at 95–105° C. for six hours, the solution is cooled and poured into 1500 ml. of water. The mixture is made alkaline with 10% sodium hydroxide solution and is extracted with chloroform. The combined chloroform extracts are washed with water, dried over potassium carbonate and then filtered. The solvent is removed from the filtrate to yield 10-[3-(p-nitrophenethylpiperazinylpropyl)]-2,3 methylenedioxyphenothiazine.

A mixture of 6.4 g. of 10-[3-(p-nitrophenethylpiperazinylpropyl)]-2,3 methylenedioxyphenothiazine dissolved in 200 ml. of warm ethanol and 0.3 g. of platinum oxide is shaken over 50 p.s.i. of hydrogen for one hour. The catalyst is filtered and washed with ethanol. The ethanol solutions are combined and the solvent is removed in vacuo on a steam bath. The residual oil is 10-[-3-p-aminophenethylpiperazinylpropyl)] 2,3 methylenedioxyphenothiazine.

What is claimed is:

1. Chemical compounds of the class consisting of a free base and its nontoxic pharmaceutically acceptable organic and inorganic acid addition salts, the free base containing the fundamental structural formula:

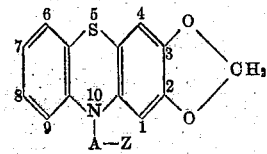

in which A is an alkylene chain having from 2 to 4 carbon atoms and separating the nitrogens to which it is attached by at least 2 carbon atoms; and Z is a member selected from the group consisting of dimethylamino, diethylamino, N-formylpiperazinyl, piperazinyl, N-methylpiperazinyl, N-hydroxyethylpiperazinyl, N-acetoxyethylpiperazinyl, N-hydroxyethoxyethylpiperazinyl, N-pyrrolidinyl, N-p-nitrophenethylpiperazinyl, and N-p-aminophenethylpiperazinyl.

2. A chemical compound having the structural formula:

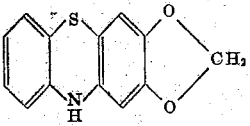

3. A chemical compound having the structural formula:

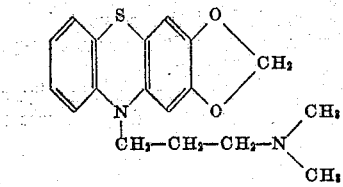

4. A chemical compound having the structural formula:

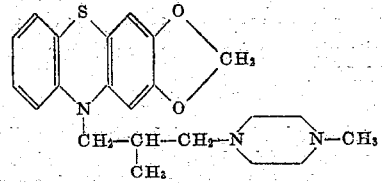

5. A chemical compound having the structural formula:

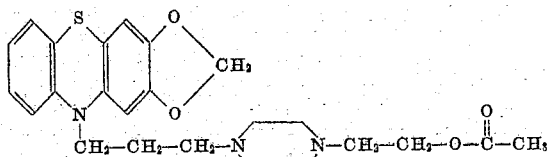

6. A chemical compound having the structural formula:

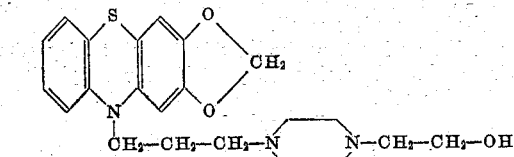

7. A chemical compound having the structural formula:

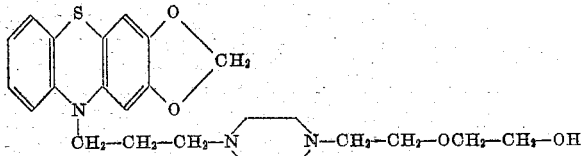

References Cited in the file of this patent

UNITED STATES PATENTS

| | | |
|---|---|---|
| 2,543,237 | Cusic | Dec. 19, 1950 |
| 2,587,662 | Smith | Mar. 4, 1952 |
| 2,785,160 | Jacob | Mar. 12, 1957 |
| 2,816,117 | Cawley | Dec. 10, 1957 |
| 2,819,273 | Drain et al. | Jan. 7, 1958 |
| 2,827,459 | Horclois | Mar. 18, 1958 |

FOREIGN PATENTS

| | | |
|---|---|---|
| 670,580 | Great Britain | Apr. 23, 1952 |
| 775,279 | Great Britain | May 22, 1957 |

OTHER REFERENCES

Baltzly et al.: J. Am. Chem. Soc., vol. 68, pp. 2673–2678 (1946).